(12) United States Patent
Streit et al.

(10) Patent No.: US 10,624,198 B2
(45) Date of Patent: Apr. 14, 2020

(54) CONTROLLING GAS FLOWS TO PLASMA ARC TORCHES AND RELATED SYSTEMS AND METHODS

(71) Applicant: Hypertherm, Inc., Hanover, NH (US)

(72) Inventors: Eric Streit, Lebanon, NH (US); Jesse A. Roberts, Cornish, NH (US); Junsong Mao, Hanover, NH (US); Richard Pavlik, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 302 days.

(21) Appl. No.: 15/686,926

(22) Filed: Aug. 25, 2017

(65) Prior Publication Data

US 2018/0063938 A1 Mar. 1, 2018

Related U.S. Application Data

(60) Provisional application No. 62/380,208, filed on Aug. 26, 2016.

(51) Int. Cl.
*B23K 10/00* (2006.01)
*H05H 1/36* (2006.01)
(Continued)

(52) U.S. Cl.
CPC ............. *H05H 1/36* (2013.01); *B23K 10/003* (2013.01); *B23K 10/006* (2013.01); *G05D 7/0623* (2013.01); *G05D 7/0676* (2013.01); *H05H 1/28* (2013.01); *H05H 1/34* (2013.01); *F16K 31/06* (2013.01); *H05H 2001/3426* (2013.01);
(Continued)

(58) Field of Classification Search
CPC .. H05H 1/34; H05H 1/36; H05H 1/28; H05H 2001/3426; H05H 2001/3484; H05H 2001/3489; B23K 10/006; B23K 10/11; G05D 7/0023
USPC ............ 219/121.39, 121.54, 121.55, 121.57, 219/12.51
See application file for complete search history.

(56) References Cited

U.S. PATENT DOCUMENTS 3,870,931 A * 3/1975 Myers ................. G05D 3/1409
361/194
4,366,524 A * 12/1982 Kuroiwa ................ F02D 41/00
123/329

(Continued)

FOREIGN PATENT DOCUMENTS

JP 2001170772 6/2001

*Primary Examiner* — Mark H Paschall
(74) *Attorney, Agent, or Firm* — Proskauer Rose LLP

(57) ABSTRACT

In some aspects, methods for controlling a pneumatic system in a plasma arc processing system can include: receiving, by a computing device, a command to begin a plasma processing operation; generating a valve command signal for a valve that includes an operational drive voltage of at least about 125% of a continuous duty cycle coil voltage rating of the valve to open the valve; and once open, adjusting the valve command signal to facilitate a steady state operation to: monitor a steady state operational duty cycle of the valve, the steady state operational duty cycle being determined by comparing the continuous duty cycle coil voltage rating of the valve to an actual operational drive voltage supplied to the valve, and control the operational drive voltage supplied to the valve to maintain a steady state operational duty cycle of the valve at less than about 60% during steady state operation.

15 Claims, 2 Drawing Sheets

(51) Int. Cl.
  *H05H 1/34* (2006.01)
  *G05D 7/06* (2006.01)
  *H05H 1/28* (2006.01)
  *F16K 31/06* (2006.01)

(52) U.S. Cl.
  CPC ............... *H05H 2001/3484* (2013.01); *H05H 2001/3489* (2013.01)

(56) References Cited

U.S. PATENT DOCUMENTS

| | | |
|---|---|---|
| 5,695,662 A | 12/1997 | Couch, Jr. et al. |
| 6,133,543 A | 10/2000 | Borowy et al. |
| 6,164,323 A * | 12/2000 | Smith ................ F15B 13/0817 137/554 |
| 2009/0005913 A1 * | 1/2009 | Fernandez ......... G05D 16/2013 700/282 |
| 2009/0057277 A1 | 3/2009 | Renault et al. |
| 2012/0261392 A1 | 10/2012 | Barnett et al. |
| 2015/0245459 A1 | 8/2015 | Namburu |
| 2016/0067812 A1 | 3/2016 | Higgins et al. |

\* cited by examiner

CONTROLLING GAS FLOWS TO PLASMA ARC TORCHES AND RELATED SYSTEMS AND METHODS

RELATED APPLICATIONS

This application claims the benefit of U.S. Provisional Patent Application Ser. No. 62/380,208, filed Aug. 26, 2016, entitled "Gas Systems and Low Amperage Control," the contents of which are hereby incorporated herein by reference in their entirety.

TECHNICAL FIELD

This disclosure relates generally to plasma arc processing systems, and more specifically to controlling gas flows to plasma arc torches and to related systems and methods.

BACKGROUND

Thermal processing torches, such as plasma arc torches, are widely used in the heating, cutting, gouging, and marking of materials. A plasma arc torch generally includes an electrode, a nozzle having a central exit orifice mounted within a torch body, electrical connections, passages for cooling, and passages for arc control fluids (e.g., plasma gas). A swirl ring can be used to control fluid flow patterns in the plasma chamber formed between the electrode and the nozzle. In operation, a plasma arc torch produces a plasma arc, which is a constricted jet of an ionized gas with high temperature and sufficient momentum to assist with removal of molten metal. Power used to operate plasma arc torches can be controlled by a power supply assembly of a plasma operating system. The power supply and/or metering console, which is often located distant relative to the torch (e.g., several feet or meters away), can include a plurality of electronic components configured to control and supply an operational current to the plasma arc torch, the gas flows provided to the plasma arc torch, and, in some cases, motion of the plasma arc torch. The power supply can include various types of components and systems to control the flow of gases to the torch, as well as to regulate the pressure of gases delivered to the torch.

SUMMARY

In some aspects, computer-implemented methods for controlling a pneumatic system in a plasma arc processing system power supply can include: receiving, by a computing device disposed within the plasma arc processing system power supply, a command to begin a plasma processing operation; generating, by the computing device, a valve command signal for a valve within the plasma power supply, the generating the valve command signal including supplying to the valve, an operational drive voltage of at least about 125% of a continuous duty cycle coil voltage rating of the valve to open the valve; and once the valve is open, adjusting, by the computing device, the valve command signal to facilitate a steady state operation of the valve, the adjusting comprising: monitoring a steady state operational duty cycle of the valve, the steady state operational duty cycle being determined by comparing the continuous duty cycle coil voltage rating of the valve to an actual operational drive voltage supplied to the valve, and controlling the operational drive voltage supplied to the valve, based on the monitoring, to maintain the steady state operational duty cycle of the valve at less than about 60% of a continuous duty cycle coil voltage rating of the valve during steady state operation.

Embodiments can include one or more of the following features.

In some embodiments, the generating the valve command signal includes generating a set of commands configured to pulse the valve to communicate a system operational state to a user. In some cases, the set of commands are customized according to a length of a torch lead between the plasma arc processing system power supply and a torch connected to the plasma arc processing system power supply via the lead. In some embodiments, the methods can also include testing, by the computing device, a gas supply to the plasma arc processing system, the testing comprising cycling the valve while monitoring a valve outlet side pressure sensor to determine whether sufficient gas supply for use is present. For example, the cycling the valve can include exciting a coil of the valve and causing a plunger of the valve to separate from a valve seat.

In some embodiments, the continuous duty cycle coil voltage to open the valve includes about 48 volts. In some embodiments, the operational drive voltage of at least about 125% of a continuous duty cycle coil voltage rating of the valve includes at least about 150%. In some embodiments, the operational drive voltage of at least about 125% of the continuous duty cycle coil voltage rating of the valve to open the valve is supplied for at least about 100 milliseconds. In some embodiments, the supplying to the valve the operational drive voltage of at least about 125% of a continuous duty cycle coil voltage rating of the valve to open the valve comprises exciting a coil of the valve and causing a plunger of the valve to separate from a valve seat. In some embodiments, the controlling the operational drive voltage supplied to the valve to maintain a steady state operational duty cycle of the valve maintains a position of a valve plunger with respect to a valve seat during the steady state operation. In some embodiments, the supplying to the valve an operational drive voltage of at least about 125% of a continuous duty cycle coil voltage rating of the valve increases a valve coil temperature operational range of the valve. In some embodiments, the controlling the operational drive voltage supplied to the valve to maintain the steady state operational duty cycle of the valve at less than about 60% during steady state operation includes using virtual over-current protection firmware. In some embodiments, the less than about 60% during steady state operation is less than about 55%.

In some embodiments, the valve includes a solenoid valve. In some embodiments, the computing device comprises system firmware.

In some aspects, methods for determining a presence of a compressed gas source being provided to a plasma arc processing system using a gas output system of the plasma arc processing system can include: providing a signal to a gas control valve of the plasma arc processing system configured to regulate gas flow to a torch of the plasma arc processing system, the signal causing the valve to at least partially open to form a gas flow area therethrough; observing a signal from a pressure sensor downstream from the gas control valve; responsive to observing a signal that indicates a gas pressure downstream meets or exceeds a threshold level, determining that a compressed gas supply is present upstream of the gas control valve; and based on determining that the compressed gas supply is present upstream of the gas control valve, permitting the plasma arc processing system to begin a processing operation.

Embodiments can include one or more of the following features.

In some embodiments, the permitting the plasma arc processing system to begin a processing operation includes permitting the plasma arc processing system to initiate a plasma arc. In some embodiments, the providing the signal to the gas control valve causing the valve to at least partially open includes exciting a coil of the valve and causing a plunger of the valve to separate from a valve seat. In some embodiments, the pressure sensor downstream from the gas control valve is arranged on a side opposite a location of the compressed gas source with respect to the gas control valve. In some embodiments, the signal causing the valve to at least partially open to form a gas flow area therethrough is provided for a predefined test time period. In some cases, the predefined test time period is less than about 100 milliseconds. In some embodiments, the providing a signal includes generating, by the computing device, a valve command signal for a valve within the plasma power supply, the generating the valve command signal including supplying to the valve, an operational drive voltage of at least about 125% of a continuous duty cycle coil voltage rating of the valve to open the valve.

Embodiments described herein can have one or more of the following advantages.

Driving a Gas Regulation Valve System

The systems and methods described herein can be helpful to provide for more consistent opening performance of a gas control valve (e.g., a gas regulator control valve (e.g., direct acting solenoid valve)) to be used within a plasma arc processing system across a wider temperature band and range of inlet pressures.

A shortcoming that can arise while operating a direct acting solenoid valve is that their consistent performance typically varies greatly with the solenoid temperature. This is because the available force to drive a regulating device (e.g., pin, armature, plunger, poppet, etc.) to open the valve is directly related to the amount of current that is passing through the solenoid coil which, for a given drive voltage, is proportional to the temperature of the coil. During operation, a direct drive coil will typically experience significant internal heating due to the resistance of the winding as well as external heating effects from ambient conditions. This can be particularly problematic for a direct acting solenoid drive coil where the plunger is oriented in an over seat condition. An over-seat valve configuration is where the high-pressure on the inlet side of the valve naturally biases the valve seal/plunger into a closed position, blocking the compressed gas from flowing to the plasma torch. With this valve arrangement, the drive coil typically must exert a large force in order to open the valve and allow gas to start flowing from the inlet to the outlet of the valve. However, after the initial opening of the valve, the required force to hold and make adjustments to the regulating device is typically lower (e.g., significantly lower). This type of valve arrangement can be particularly susceptible to sluggish openings or even failures to open when the system conditions have caused high temperatures to accumulate at the valve coil.

By using an actual drive voltage (ADV) that is higher than the continuous duty coil voltage rating (CDCV) (e.g., at least 125% of the CDCV), the over-seat valve performance can be improved because the extra power compensates for the effects of the increased resistance due to heating of the coil during operation of the regulator valve. A challenge associated with this higher drive voltage however can be that without careful controls, the coil could be subject to higher resistive losses, causing more internal heating and leading to coil failure. In order to maintain the benefits of the higher drive voltage, while also protecting the coil from overload, the plasma system should be employed with a virtual drive voltage (VDV) equal to the continuous duty coil voltage rating. The VDV is typically established using pulse width modulation where the maximum % PWM=CDCV/ADV. In this manner, the coil current can be limited for steady state operation, so that recommended thermal limits are typically not exceeded. For short bursts of current to the coil (and force on the valve), the PWM limit can be removed, resulting in consistent opening times from the over-seat configured solenoid valve.

For a plasma system, consistent opening times from a valve are helpful to optimizing plasma process, consumable life, reducing faults and nuisance problems for the customer. Using a high ADV with a steady state VDV that will protect the coil from overheating is a key to reducing coil size and weight while ensuring optimal performance from an over-seat, direct acting solenoid valve. Consistent opening times across a wider range of inlet pressures and temperatures when used with an over-seat configured, direct acting, proportional, solenoid valve.

Detecting Inlet Gas Pressure Using a Gas Regulation System without an Inlet Pressure Sensor Many conventional plasma cutting systems use an external source of compressed gas to be supplied to the inlet side of the plasma system (e.g., upstream of a pressure regulator valve). It is typically advantageous to have a method for detecting the presence of this compressed air source (e.g., a user has plugged a compressed air line into the system) as a baseline requirement before permitting operation, such as a cutting procedure or gouging procedure. Typically, conventional methods for detecting inlet gas use a dedicated pressure switch located in the power supply upstream from the gas valve seal and/or metering device. However, the systems and methods described herein can include removing this dedicated upstream pressure sensor but otherwise retain its inlet gas supply testing capability and adds system-level flexibility.

In some cases, the systems and methods herein include methods for monitoring the inlet side pressure magnitude by using pressure checks that allow short bursts of air to flow through the pressure regulator valve to an outlet side integrated valve sensor. These checks can be performed at predetermined (e.g., strategic) times in order to check for the presence of compressed gas on the inlet side of the gas valve prior to operation/arc initiation. As a result, the systems and methods described herein can advantageously yield part reduction (e.g., a reduction in a number of components used within the system) and cost savings, in addition to increase flexibility in techniques used for the inlet pressure monitoring, which can allow for more precise fault detection than conventional methods.

Additionally, methods of inlet pressure detection described herein can offer several key advantages over conventional methods using upstream (e.g., inlet-side) pressure switches. For example, using an outlet side, integrated and calibrated pressure sensor can add flexibility for pressure thresholds rather than relying on a hardware switch threshold. Additionally, cost savings and failure point reduction are other possible benefits of eliminating an inlet side switch and using the detection methods described herein.

DETAILED DESCRIPTION

Plasma arc torch power supplies can include pressure regulator valves that are configured to control the flow of gases (e.g., pressurized gases used to create a plasma arc) to the torch. As described herein, pressure regulator valves can be utilized to implement various gas flow control and testing techniques to make the plasma arc torch systems easier or more efficient to use.

Overdriving Gas Control Valves to Open

In some aspects, plasma arc processing systems can include gas control valves (e.g., pressure regulating gas control valves) configured to be overdriven during an initial opening sequence. As a result of temporarily overdriving the valve during the initial opening sequence, a time at which more force is typically required than when holding the valve in a particular opened position, smaller, more efficient valves can be used in the system.

Figure 1:
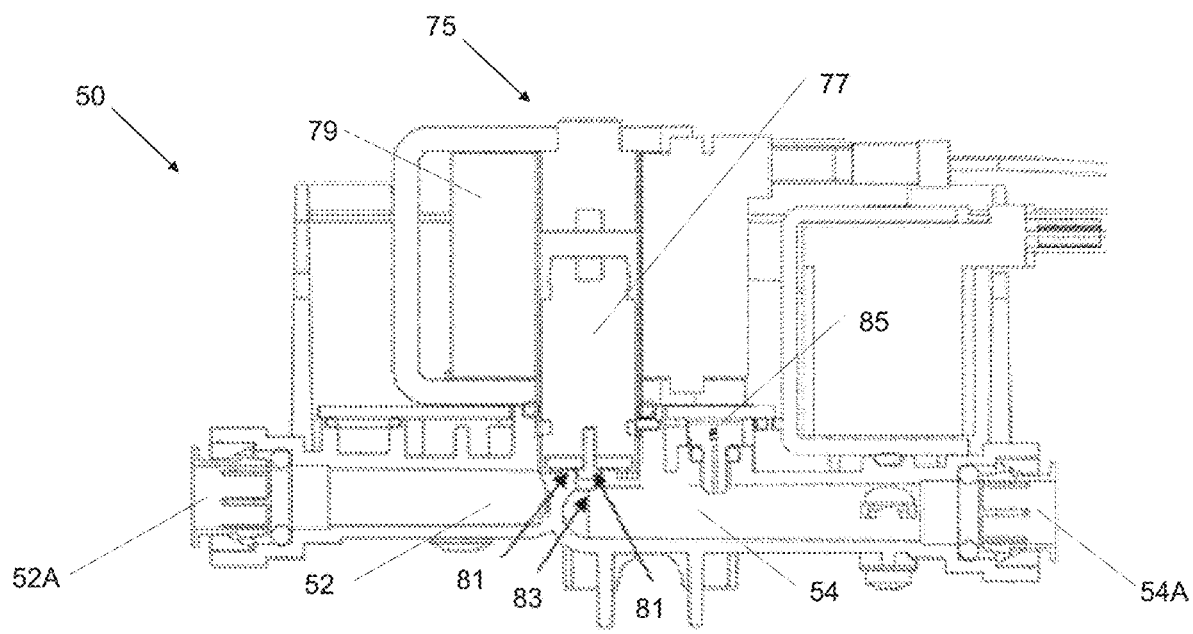
FIG. 1 is a cross-sectional diagram of an example gas control module of the plasma arc processing system, illustrating a gas control valve with a valve coil and plunger to permit compressed gas from flowing between an inlet and outlet.

For example, as depicted in FIG. 1, a plasma arc processing system power supply can include a gas control module 50 configured to control and regulate flow of compressed air to a plasma torch. The gas control module 50 can be fluidly connected to a gas inlet 52 (and gas inlet port/connector 52A) in order to limit or permit flow of the compressed gas supplied to the inlet 52 to a gas outlet 54 (and gas outlet port/connector 54A), which is fluidly connected to the plasma torch.

The inlet 52 can be defined as a region of the gas train that is blocked by a valve or metering device (e.g., a valve 75) such that with some system command, the pressurized gas is blocked from entering the torch of the plasma system. Furthermore, the inlet side of the plasma system is typically designed to accept a hose or tubing containing a compressed gas that can be delivered through the gas train to the torch for producing a plasma jet. The outlet port 54 is a region within the gas train that is typically directly coupled, pneumatically, to the plasma torch with no additional valving or means of blocking (e.g., metering, choking, manipulating) the flow of compressed gas to the torch.

To control gas flow, the gas module 50 can include a valve (e.g., solenoid valve, such as a pressure regulating gas control valve or two-position valve) 75 that includes a sliding plunger (e.g., piston) 77 that is controlled by a valve coil 79. In a resting state, the plunger 77 is configured to seal against a valve seat 81 to limit (e.g., prevent) gas from flowing from the inlet 52 through an orifice 83 and on to the outlet 54. When the coil 79 is excited (e.g., with an electrical charge), the plunger 77 lifts off of the valve seat 81 and forms a gas passage, allowing gas to flow freely between the inlet 52 and outlet 54 (e.g., between inlet port 52A and outlet port 54A).

Figure 2:
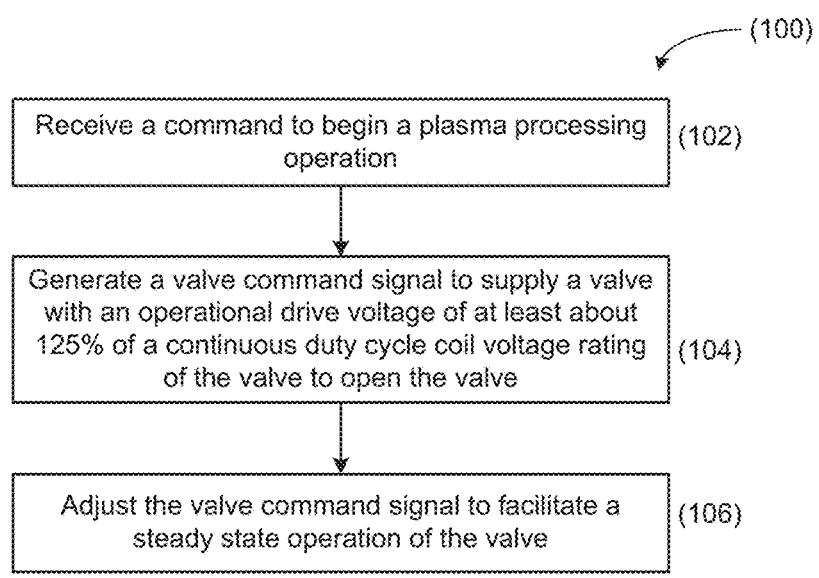
FIG. 2 is a diagram of an example method for operating a gas control valve within a plasma arc processing system to control flow of compressed air to a plasma arc torch.

As described herein, the gas control valves can be operated in any of various manners to help make a plasma arc torch easier or more efficient to use. For example, referring to FIG. 2, in some embodiments, computer-implemented methods for controlling a pneumatic system in a plasma arc processing system power supply (100) can first include receiving, by a computing device (e.g., controller having a processor) disposed within the plasma arc processing system power supply, a command to begin a plasma processing operation (102). For example, the command can be generated in response to a user attempting to perform an operation. In some cases, this can include a user pressing a switch or button on a torch to begin cutting, which can send a signal to a controller of the plasma cutting system.

In some embodiments, the computing device (e.g., controller having a processor (e.g., an application-specific integrated circuit (ASIC) or a field-programmable gate array (FPGA))) disposed within the plasma arc processing system power supply includes pressure measuring routines, close-loop control algorithm, fault handling logic, valve drivers. In some embodiments, the computing device includes system firmware that is configured to control the whole plasma supply system.

Based on the command to begin the operation, the methods can then generate, using the computing device, a valve command signal for a valve (e.g., the valve 75) within the plasma power supply (104). The valve command signal can include supplying an operational drive voltage to the valve that is greater than 100% of continuous duty cycle coil voltage rating of the valve to open the valve. In some cases, the continuous duty cycle coil voltage rating of the valve can be a set characteristic of the valve, such as a set limit based on valve on-time. That is, the command signal can overdrive the valve beyond a voltage amount at which steady state operation can (or should) be sustained in order to open the valve. In some embodiments, the command signal can include initially supplying at least about 125% (at least about 150%) of a continuous duty cycle coil voltage rating of the valve to open the valve, then, as time passes by, drive the valve on the defined profiles. In some embodiments, the supplying the operational drive voltage to open the valve includes exciting a coil of the valve and causing a plunger of the valve to separate from a valve seat. Thus, the high voltage can be provided for a predetermined time period generally sufficient or expected so that the valve can be opened. For example, in some embodiments, the higher voltage is supplied for at least about 100 milliseconds (e.g., about 500 milliseconds).

In some embodiments, the continuous duty cycle coil voltage to open the valve includes about 48 volts. That is, the valve can be overdriven with about 48 volts to open the valve.

In some cases, overdriving the valve in this manner can positively affect the valve's ability to operate in a wide range of temperatures. For example, in some embodiments, the supplying to the valve an operational drive voltage of at least about 125% of a continuous duty cycle coil voltage rating of the valve increases a valve coil temperature operational range of the valve.

In some embodiments, the generating the valve command signal includes generating a set of commands configured to pulse the valve to communicate a system operational state to a user (e.g., a system setting, a system failure, a preferred process for the set of consumables, etc.). In some embodiments, the set of pulses can be customized according to a length of a torch lead between the plasma arc processing system power supply and a torch connected to the plasma arc processing system power supply via the lead. This variation in the set of pulses according to torch lead length accounting for various differences in gas compression, signal/pulse clarity, and message communication to the operator. For example a 25 foot torch lead can relay a message to the operator with pulses which are separated by very short time periods (e.g., 10 milliseconds), however, with a 50 foot torch lead length these separate distinct pulses separated by about 10 milliseconds begin to become less distinct and harder to perceive for the end user. As such, for a longer lead length, a longer time period between pulses is typically used.

Once the valve has been opened using the higher voltage (e.g., to fluidly connect the inlet 52 to the outlet 54), the methods can include adjusting, using the computing device, the valve command signal to facilitate a steady state operation of the valve (106). That is, once the valve is opened, the computing device can adjust the signal provided to the valve so that it is suitable for steady state processing (e.g., ongoing operation). Since the valve is opened using a voltage that is generally in excess of its continuous duty cycle voltage rating, the voltage provided to the valve can be adjusted (e.g., reduced) to a value that is within its continuous duty cycle coil voltage rating. In some embodiments the voltage can be cycled between two values, one low and one high to yield and average voltage value equivalent to the CDCV.

For example, the computing device can monitor a steady state operational duty cycle of the valve. For example, in some cases, the steady state operational duty cycle can be determined by comparing the continuous duty cycle coil voltage rating of the valve to an actual operational drive voltage supplied to the valve. That is, the computing device can monitor the actual voltage supplied to the valve (e.g., to the coil) in order to keep it open and compare that actual voltage to the amount of voltage at which the valve is rated for steady state operation.

In the addition, the adjusting the valve command signal can include controlling the operational drive voltage supplied to the valve. For example, the system can be configured to maintain a steady state operational duty cycle of the valve at less than its continuous duty cycle coil voltage rating. The controlling the operational drive voltage supplied to the valve to maintain the steady state operational duty cycle of the valve can maintain a position (e.g., a distance) of a valve plunger with respect to a valve seat during the steady state operation. For example, in some embodiments, the operational drive voltage supplied to the valve is less than about 60% (e.g., less than about 50%) during steady state operation.

The voltage supplied to the valve can be controlled in any of various techniques. For example, in some embodiments, the controlling the operational drive voltage supplied to the valve during steady state operation can include using virtual over-current protection firmware to limit the drive output.

In some aspects, the methods can further include using the computing device to test a gas supply to the plasma arc processing system. For example, as described below, the testing can include cycling the valve while monitoring a valve outlet side pressure sensor (e.g., the sensor 85) to determine whether sufficient gas supply for use is present. In some cases, the cycling the valve includes exciting the coil of the valve to cause a plunger of the valve to separate from a valve seat. As described above, the separating the valve plunger from the valve seat can permit gas flow therethrough.

Using Valve to Test for Presence of Compressed Gas Supply

In addition to controlling gas flow to the torch, control valves described herein (e.g., valve 75) can be used to test for a presence of compressed gas (e.g., air) supplied to the system. For example, the valve assemblies described herein can be subjected to a series of commands and monitoring from the plasma system controller which allow it to monitor the presence of pressurized gases at the inlet side of the valve. In order to check for pressurized gas on the inlet side of the valve, the coil can be activated (energized) allowing pressurized gas to flow from the inlet side to the outlet side of the valve. In some cases, in order to limit (e.g., prevent) unwanted gases from flowing through the torch during this test period, another valve (e.g., the dump valve) can also be opened to allow the pressurized gas to flow freely through the valve while minimizing an impact on the pressure in the torch lead. These methods allow for a more precise monitoring of the inlet pressure magnitude as compared to some conventional methods of monitoring the inlet pressure where a mechanical limit switch was activated or de-activated at a fixed pressure value.

The test methods for inlet pressure monitoring described herein also allow the system to adopt various pressure thresholds as can be advantageous for the various plasma processes. For example, gouging is typically performed at a lower plenum pressure, and in turn could accept a lower inlet pressure than what may be used for cutting. The close proximity of the integrated pressure sensor to the metering orifice allows the system to evaluate the localized pressure wave of the air as it travels through the valve and make a close approximation of the pressure of the air on the opposite side of the valve.

Further, the testing sequences described herein can be based on pressure or time. For example, the system could be programmed such that when some pressure threshold is reached, the valve will be de-energized, closing the valve and preventing further gas flow from the inlet to the outlet side of the valve. The valve could remain open for a fixed period of time or until the pre-determined threshold is reached. By setting a low pressure threshold, the checks can be performed with negligible impact to the user (audible or detectable at torch). In some embodiments, the system can test for the pressure threshold for a certain amount of time. If the threshold is not reached during that time, the system can determine that a gas supply is not provided.

Improved product robustness and reduced cost can also be achieved by component reduction. The component being eliminated is a pressure switch that is typically located in a plasma power supply, within the pneumatic system, in front of the gas control valve (fore line). The purpose of this switch is to detect if and when an operator has connected a pressurized gas line (typically carrying air) to the plasma system. A lack of pressure in the fore line, is detected by the pressure switch and is used to lock-out use of the plasma system and/or indicate a lack of pressurized gas on the system control panel. The proposed provides nearly the same capability without the use of the pressure switch. By briefly opening the valve and performing an evaluation of the pressure rise on the outlet side of the valve (using a pressure transducer) the system can detect if high pressure gas is present in the fore line.

Referring back to FIG. 1, the valve 75 in combination with a downstream pressure sensor (e.g., integrated pressure transducer (e.g., a PCB mounted integrated pressure sensor (e.g., PCB mounted, valve pressure sensor on valve output))) 85 can be used to detect upstream gas pressure to indicate that a gas pressure supplied is connected to the plasma system. In some embodiments, the sensor is not integrated. Implementing the methods below of using downstream pressure sensors to determine upstream gas pressure can be helpful to reduce the number of components within the system (e.g., by eliminating an upstream pressure sensor), making the system more efficient.

Figure 3:
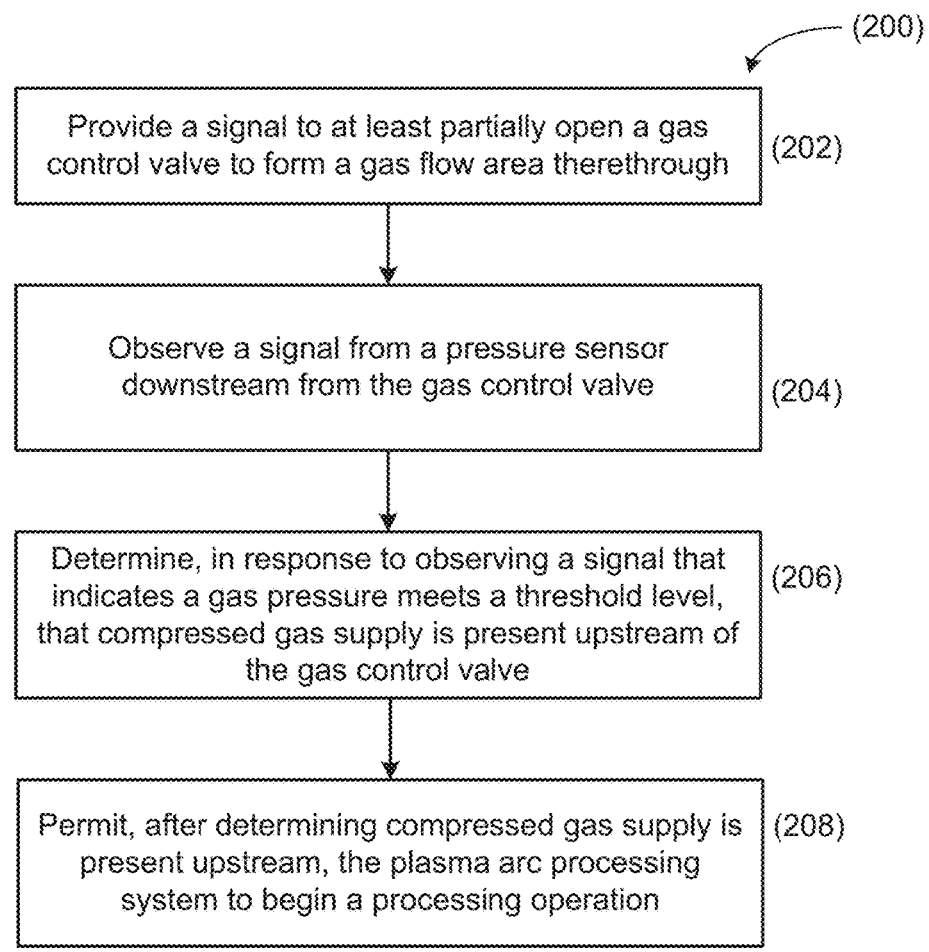
FIG. 3 is a diagram of an example method for determining a presence of a compressed gas source being provided to a plasma arc processing system using a gas output system of the plasma arc processing system.

For example, referring to FIG. 3, in some aspects, methods (200) can be implemented for determining a presence of a compressed gas source being provided to a plasma arc processing system using a gas output system of the plasma arc processing system.

The methods can first include providing a signal to a gas control valve (e.g., the valve 75) of the plasma arc processing system configured to regulate gas flow to a torch of the plasma arc processing system (202). For example, the signal can cause the valve to at least partially open to form a gas flow area therethrough (e.g., between the inlet 52 and the outlet 54). In some embodiments, the providing the signal to the gas control valve causing the valve to at least partially open includes exciting a coil of the valve (e.g., the coil 79) and causing a plunger (e.g., the plunger 77) of the valve to separate from a valve seat (e.g., the seat 81).

In some embodiments, the signal causing the valve to at least partially open to form a gas flow area therethrough can be provided for a predefined test time period. For example, the predefined test time period can be less than about 100 milliseconds.

Next, the methods can include observing a signal from a pressure sensor downstream from the gas control valve (204). For example, with the valve at least partially open, the computing device can monitor gas pressure observed in the outlet providing gas to the plasma torch (e.g., the outlet 54) using a pressure sensor (e.g., the pressure sensor 85). In some cases, the pressure sensor downstream from the gas control valve is arranged on a side opposite a location of the compressed gas source with respect to the gas control valve.

Next, in response to observing a signal that indicates a gas pressure downstream meets or exceeds a threshold level, the system can determine that a compressed gas supply is present upstream of the gas control valve (206). When the valve opens, if pressurized gas is provided to the inlet of the gas module, the gas will flow through the opened valve and pressurize the outlet. Thus, the pressure sensor in the outlet can determine presence of the pressurized gas in the inlet. In some cases, the valve can be opened for a predetermined amount of time. If the pressure threshold is not met during that predetermined amount of time, the system can determine that pressurized gas is not provided to the inlet.

After determining that the compressed gas supply is present upstream of the gas control valve, the system can permit the plasma arc processing system to begin a processing operation (208). In some embodiments, the permitting the plasma arc processing system to begin a processing operation can include permitting the plasma arc processing system to initiate a plasma arc.

That is, when compressed gas is present on the inlet side of the valve, it will flow into the outlet port and a pressure rise can be detected by the pressure sensor, which can confirm the presence of compressed gas. Alternatively, if compressed gas is not present in the inlet port (e.g., due to a line not being connected or a low gas pressure), the pre-determined pressure threshold will not be reached when the valve opens to perform this "pressure check." In such cases, the lack of meeting the threshold can cause the software to enter a fault state and inform the operator of the status. In some cases, an alarm can alert the user of the lack of pressurized gas.

Pneumatic Torch Communication Methods

The systems and methods herein can also be used to communicate various messages to the user using pneumatics and gas control. In some conventional systems, operators currently rely on visual indications, such as lights on a front face of the plasma supply, to relay system status or other messages to a user. Depending on the ambient light environment or position of the user relative to the plasma supply, these visual indications may not be readily recognizable. However, in some embodiments, the systems and methods herein can utilize the pneumatic supply system (e.g., gas control and delivery system) as a way to deliver tactile feedback to the user regarding key state changes or status updates for their plasma system (e.g., a lack of or loss of adequate inlet gas pressure). In some embodiments, the systems described herein can be configured to deliver a signal, such as a vibrating or pulsing sensation, in the hands of the operator to indicate or warn that the system has changed, for example, from "cap off" or "torch disabled" state to "ready to cut" state. For example, the system can be configured to generate a pulsing signal within a torch that the user can feel and/or hear. A benefit of this concept is to offer two additional techniques to communicate with an operator (tactile and audible) about system status and/or delivering warnings.

Such tactile signals can be generated in a variety of ways. For example, the gas control valve can be pulsed open (e.g., by providing a short voltage pulse to the coil) to discrete pressure waves within the system that can be introduced through the torch lead to the consumables. The pressure pulse can quickly cycle the electrode back and forth through its range of motion (e.g., for a spring electrode repeatedly compressing the spring and rattling the electrode within the torch), which can deliver not only a tactile signal but also an audible warning to the operator as the electrode vibrates off of the nozzle within the torch.

A challenge is delivering strong, discrete pressure waves across many torch volumes for a desired range of inlet pressures. Longer torches typically require different frequencies and in some cases duty cycles to provide for suitable electrode movement and velocity in order to create a noticeable pulse. For desired communication, it is useful that the consumables slide back and forth for maximum resonance. Different torch lead lengths typically require different frequencies to generate clear and consistent outputs for operator. If frequency is off, the consumable response and output can be 'mushy' or 'slushy.' Additionally, the number of pulses may vary between lead lengths. For example, for fixed timing, the number of pulses can change based on lead length (e.g., 2 pulses for 75 foot length and up to about 4 or 5 pulses for a short lead length. Other arrangements are possible. For example, for a 25 foot lead length, 8 pulses at 7 Hz can be provided over 1 second. In another example, for a 50 foot lead length, 6 pulses at 2.5 Hz can be provided over 2 seconds. In another example, for 75 foot lead length, 9 pulses at 4 Hz can be provided over 2 seconds. In some cases, lead diameters can be larger for different leads, which can change the way that the air would travel therethrough, affecting the configuration of pulses to be used.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A computer-implemented method for controlling a pneumatic system in a plasma arc processing system power supply, the method comprising:

receiving, by a computing device disposed within the plasma arc processing system power supply, a command to begin a plasma processing operation;

generating, by the computing device, a valve command signal for a valve within the plasma power supply, the generating the valve command signal including supplying to the valve, an operational drive voltage of at least about 125% of a continuous duty cycle coil voltage rating of the valve to open the valve; and once the valve is open, adjusting, by the computing device, the valve command signal to facilitate a steady state operation of the valve, the adjusting comprising:

monitoring a steady state operational duty cycle of the valve, the steady state operational duty cycle being determined by comparing the continuous duty cycle coil voltage rating of the valve to an actual operational drive voltage supplied to the valve, and controlling the operational drive voltage supplied to the valve, based on the monitoring, to maintain the steady state operational duty cycle of the valve at less than about 60% of a continuous duty cycle coil voltage rating of the valve during steady state operation.

2. The method of claim 1, wherein the generating the valve command signal includes generating a set of commands configured to pulse the valve to communicate a system operational state to a user.

3. The method of claim 2, wherein the set of commands are customized according to a length of a torch lead between the plasma arc processing system power supply and a torch connected to the plasma arc processing system power supply via the lead.

4. The method of claim 1, further comprising testing, by the computing device, a gas supply to the plasma arc processing system, the testing comprising cycling the valve while monitoring a valve outlet side pressure sensor to determine whether sufficient gas supply for use is present.

5. The method of claim 4, wherein the cycling the valve comprises exciting a coil of the valve and causing a plunger of the valve to separate from a valve seat.

6. The method of claim 1, wherein the continuous duty cycle coil voltage to open the valve comprises about 48 volts.

7. The method of claim 1, wherein the operational drive voltage of at least about 125% of a continuous duty cycle coil voltage rating of the valve comprises at least about 150%.

8. The method of claim 1, wherein the operational drive voltage of at least about 125% of the continuous duty cycle coil voltage rating of the valve to open the valve is supplied for at least about 100 milliseconds.

9. The method of claim 1, wherein the supplying to the valve the operational drive voltage of at least about 125% of a continuous duty cycle coil voltage rating of the valve to open the valve comprises exciting a coil of the valve and causing a plunger of the valve to separate from a valve seat.

10. The method of claim 1, wherein the controlling the operational drive voltage supplied to the valve to maintain a steady state operational duty cycle of the valve maintains a position of a valve plunger with respect to a valve seat during the steady state operation.

11. The method of claim 1, wherein the supplying to the valve an operational drive voltage of at least about 125% of a continuous duty cycle coil voltage rating of the valve increases a valve coil temperature operational range of the valve.

12. The method of claim 1, wherein the controlling the operational drive voltage supplied to the valve to maintain the steady state operational duty cycle of the valve at less than about 60% during steady state operation comprises using virtual over-current protection firmware.

13. The method of claim 1, wherein the less than about 60% during steady state operation comprises less than about 55%.

14. The method of claim 1, wherein the valve comprises a solenoid valve.

15. The method of claim 1, wherein the computing device comprises system firmware.

* * * * *